United States Patent
Jiang et al.

(10) Patent No.: US 11,721,099 B2
(45) Date of Patent: Aug. 8, 2023

(54) CLOUD BASED ACTIVE COMMISSIONING SYSTEM FOR VIDEO ANALYTICS

(71) Applicant: Carrier Corporation, Farmington, CT (US)

(72) Inventors: Zhengwei Jiang, East Hartford, CT (US); Jianwei Zhao, Shanghai (CN); Zhen Jia, Shanghai (CN); Jie Xi, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 942 days.

(21) Appl. No.: 15/999,803

(22) PCT Filed: Feb. 17, 2017

(86) PCT No.: PCT/US2017/016766
§ 371 (c)(1),
(2) Date: Aug. 20, 2018

(87) PCT Pub. No.: WO2017/142736
PCT Pub. Date: Aug. 24, 2017

(65) Prior Publication Data
US 2021/0216774 A1    Jul. 15, 2021

Related U.S. Application Data

(60) Provisional application No. 62/297,551, filed on Feb. 19, 2016.

(51) Int. Cl.
*G06V 20/40*        (2022.01)
*G06F 16/71*        (2019.01)
(Continued)

(52) U.S. Cl.
CPC .............. *G06V 20/41* (2022.01); *G06F 16/71* (2019.01); *G06V 10/987* (2022.01); *G06V 20/40* (2022.01); *G06V 20/52* (2022.01); *G06V 20/44* (2022.01)

(58) Field of Classification Search
CPC .......... G06K 9/00711; G06K 9/00771; G06K 2009/00738; G06F 16/71
See application file for complete search history.

(56) References Cited

U.S. PATENT DOCUMENTS 8,903,219 B2    12/2014 Fan
9,478,033 B1 *  10/2016 Safreed ................... G06T 7/251
(Continued)

FOREIGN PATENT DOCUMENTS

WO       2013131189 A1    9/2013

OTHER PUBLICATIONS

Accenture, "Video Analytics Operational, Marketing and Security Insights from CCTV", accessed Aug. 16, 2018, available at: https://www.accenture.com/t20150523T055755_w_/us-en/_acnmedia/Accenture/Conversion-Assets/DotCom/Documents/Global/PDF/Technology_2/Accenture-Video-Analytics-Operational-Marketing-and-Security-Insights-from-CCTV.pdf, 8 pages.
(Continued)

*Primary Examiner* — Amara Abdi
(74) *Attorney, Agent, or Firm* — Cantor Colburn LLP (57) ABSTRACT

A method and an active commissioning system for video analytics (VA) of video surveillance are provided. The method includes capturing, using a video capture device, a video sequence and receiving, at a VA processor, a parameter set from a cloud resource, wherein the parameter set is used for video analytics. The method also includes processing the video sequence by selecting subparts of the video sequence as events, wherein the events are detected based on the
(Continued)

parameter set, generating a visualized report using the events from the VA processor and providing the visualized report to an operator, marking, by the operator, yes/no on the events in the visualized report, generating annotations for events based on the marking, and transmitting the annotations and the events to the cloud resource for processing, wherein the cloud resource processes the annotations and events and provides the parameter set based on the processing.

17 Claims, 6 Drawing Sheets

(51) Int. Cl.
G06V 20/52 (2022.01)
G06V 10/98 (2022.01)

(56) References Cited

U.S. PATENT DOCUMENTS

| | | | | |
|---|---|---|---|---|
| 9,881,084 | B1* | 1/2018 | Robertson | G06F 16/78 |
| 2002/0172288 | A1* | 11/2002 | Kwon | H04N 19/523 |
| | | | | 375/E7.113 |
| 2007/0052809 | A1 | 3/2007 | Hammadou | |
| 2011/0295549 | A1* | 12/2011 | Takabayashi | G01S 13/86 |
| | | | | 702/142 |
| 2011/0316697 | A1 | 12/2011 | Krahnstoever et al. | |
| 2012/0195363 | A1 | 8/2012 | Laganiere | |
| 2013/0163961 | A1* | 6/2013 | Wu | H04N 21/8146 |
| | | | | 386/E5.028 |
| 2013/0166711 | A1* | 6/2013 | Wang | G08B 13/19656 |
| | | | | 709/223 |
| 2013/0242093 | A1* | 9/2013 | Cobb | G06V 20/52 |
| | | | | 348/143 |
| 2014/0043480 | A1 | 2/2014 | Wu | |
| 2014/0201126 | A1* | 7/2014 | Zadeh | A61B 5/165 |
| | | | | 706/52 |
| 2014/0333776 | A1 | 11/2014 | Dedeoglu et al. | |
| 2015/0154840 | A1 | 6/2015 | Black et al. | |
| 2015/0290808 | A1 | 10/2015 | Renkis | |
| 2016/0042621 | A1* | 2/2016 | Hogg | H04N 23/64 |
| | | | | 348/155 |
| 2016/0125268 | A1* | 5/2016 | Ebiyama | G06V 10/50 |
| | | | | 382/218 |
| 2016/0379074 | A1* | 12/2016 | Nielsen | G06T 7/254 |
| | | | | 348/143 |

OTHER PUBLICATIONS

Agent Video Intelligence Ltd., "Agent Vi Launches Video Analytics Cloud Service for Business Intelligence Applications", Apr. 1, 2015, available at: http://www.agentvi.com/pr-1059-Agent_Vi_Launches_Video_Analytics_Cloud_Service_for_Business_Intelligence_Applications, 4 pages.
Amazon listing, "OnVsu Wireless HD IP indoor camera with Recording & Remote", accessed Aug. 17, 2018, available at: https://www.amazon.in/OnVsu-Wireless-indoor-Recording-Viewing/dp/B00M58WZ8K, 3 pages.
Cameramanager, "CLVR Video Analytics in the Cloud", accessed Aug. 16, 2018, available https://www.cameramanager.com/website/sites/default/flles/DEF_CameraManager-CLVR_factsheetHiRes_0.pdf, 2 pages.
Fernandez, Alberto et al., "A Real-Time Big Data Architecture for Glasses Detection Using Computer Vision Techniques", 2015 3rd International Conference on Future Internet of Things and Cloud, IEEE, Aug. 24, 2015, pp. 591-596.
Gorilla Technology Group, "Transform Your Business with Video Analytics and IoT Technology" accessed Aug. 17, 2018, available at: https://www.gorilla-technology.com/, 5 pages.
Intelli-Vision, "AI and Video Analytics for Smart Cameras", accessed Aug. 16, 2018, availbable at: https://www.intelli-vision.com/, 1 page.
International Search Report and Written Opinion for applicaiton PCT/US2017/016766, available at Apr. 26, 2017, 14 pages.
Kasturi, Rangachar, et al., "Framework for Performance Evaluation of Face, Text, and Vehicle Detection and Tracking in Video: Data, Metrics, and Protocol", IEEE Transactions on Pattern Analysis and Machine Intelligence, vol. 31, No. 2, Feb. 2009, pp. 319-336.
Via Sys, "Analytics in the Cloud", accessed Aug. 16, 2018, available at: http://www.viasys-iv.com/index.php?option=com_content&view=article&id=127&Itemid=172, 12 pages.
Wikipedia article, "Cluster analysis", accessed: Aug. 16, 2018, available at: [http://en.wikipedia.org/wiki/Cluster_analysis, 17 pages.
Wikipedia article, "Heirachical clustering", accessed Aug. 16, 2018, available at: http://en.wikipedia.org/wiki/Hierarchical_clustering, 7 pages.
Wikipedia article, "Hungarian algorithm", accessed Aug. 16, 2018, available at: http://en.wikipedia.org/wiki/Hungarian_algorithm, 5 pages.
Wikipedia article, "Precision and recall", accessed Aug. 17, 2018, available at: https://en.wikipedia.org/wiki/Precision_and_recall, 11 pages.
Xu, Rui et al., "Survey of Clustering Algorithms", IEEE Transactions on Neural Networks, vol. 16, No. 3, May 2005, pp. 645-678.
Yilmaz, Alper et al., "Object Tracking: A Survey", ACM Computing Surveys, vol. 38, No. 4, Article 13, Publication date: Dec. 2006, 45 pages.
YouTube clip, "Video Analytics with Scopix", posted by TechWise, accessed: Aug. 17, 2018, available at: https://www.youtube.com/watch?v=U6XqTp5CdTU , 2 pages.

* cited by examiner

CLOUD BASED ACTIVE COMMISSIONING SYSTEM FOR VIDEO ANALYTICS

BACKGROUND

The subject matter disclosed herein generally relates to computer vision, video processing, and cloud computing and, more particularly, to cloud based video analytics.

Normally, for video analytics algorithms, engineers or technicians with expert knowledge of computer vision need to spend a long time to configure the system to get best performance by manually trying different sets of parameters. This is a very time consuming task, and also requires highly educated operators. Both raise the system setup cost and maintenance cost, especially when the application scenarios or environment changes.

Accordingly, there exists a desire to provide a method and system that can help relieve some of the cost associated with local video analytics through the use of, for example, some form of cloud computing.

SUMMARY

According to one embodiment, a method for an active commissioning system for video analytics (VA) of video surveillance is provided. The method includes capturing, using a video capture device, a video sequence, receiving, at a VA processor, a parameter set from a cloud resource, wherein the parameter set is used for video analytics, processing the video sequence, using the VA processor, by selecting subparts of the video sequence as events, wherein the events are detected based on the parameter set used by the VA processor, generating a visualized report using the events from the VA processor and providing the visualized report to an operator, marking, by the operator, yes/no on the events in the visualized report, generating annotations for events based on the marking, and transmitting the annotations and the events to the cloud resource for processing, wherein the cloud resource processes the annotations and events and provides the parameter set based on the processing.

In addition to one or more of the features described above, or as an alternative, further embodiments of the method include receiving the annotations and the events in a video database of the cloud resource, processing events with annotations with an exhaustive VA processor of the cloud resource, generating feasible parameter sets based on the exhaustively processed events with annotations from the exhaustive VA processor, processing video segments without annotations with a low-level feature extractor of the cloud resource and generating a low-level feature descriptor of the video sequence, generating, using a feature parameter mapping model, possible parameter sets based on the low-level feature descriptor, selecting the parameter set based on the feasible parameter set and the possible parameter set, and transmitting the parameter set from the cloud resource to the VA processor.

In addition to one or more of the features described above, or as an alternative, further embodiments of the method include wherein generating feasible parameter sets based on the exhaustively processed events with annotations from the exhaustive VA processor includes selecting all parameter sets that can detect the event as annotated, avoiding parameter sets that provide erroneous detection of the event, and combining all selected parameter sets for all events with annotations from the video sequence.

In addition to one or more of the features described above, or as an alternative, further embodiments of the method include wherein the subparts of the video sequence include one or more of unedited video segments, unedited image stills, cropped video segments, cropped image stills, edited video segments, and edited image stills.

In addition to one or more of the features described above, or as an alternative, further embodiments of the method include wherein the video capture device is one selected from a group consisting of a stationary surveillance camera, a mobile surveillance camera, a photo camera, a mobile device mounted camera, a motor vehicle mounted camera, and a unmanned aerial vehicle mounted camera.

In addition to one or more of the features described above, or as an alternative, further embodiments of the method include wherein the parameter set includes one or more parameters selected from a group consisting of object size, object shape, object movement pattern, object acceleration rate, object velocity, object color, number of objects, interaction between objects, time values of object in certain positions, time values of object in certain locations, time of day, object type, video background learning update rate, video background learning initial learning time, object stopping time, and object loitering time.

In addition to one or more of the features described above, or as an alternative, further embodiments of the method include wherein an event includes detecting or tracking one or more of the parameters included in the parameter set, general objects detection, object loitering detection, and object left-behind detection.

According to one embodiment an active commissioning system for video analytics (VA) for video surveillance is provided. The active commissioning system includes a customer side that includes a customer memory having computer readable instructions, and one or more customer processors configured to execute the computer readable instructions. The computer readable instructions include capturing, using a video capture device, a video sequence, receiving a parameter set from a cloud resource, wherein the parameter set is used for video analytics, processing the video sequence by selecting subparts of the video sequence as events, wherein the events are detected based on the parameter set, generating a visualized report using the events and providing the visualized report to an operator, marking, by the operator, yes/no on the events in the visualized report, generating annotations for events based on the marking, and transmitting the annotations and the events to the cloud resource for processing, wherein the cloud resource processes the annotations and events and provides the parameter set based on the processing.

In addition to one or more of the features described above, or as an alternative, further embodiments of the active commissioning system include a cloud side that includes the cloud resource that is included of a cloud memory having computer readable instructions, and one or more cloud processors configured to execute the computer readable instructions. The computer readable instructions include receiving the annotations and the events in a video database, processing events with annotations with an exhaustive VA processor, generating feasible parameter sets based on the exhaustively processed events with annotations from the exhaustive VA processor, processing video segments without annotations with a low-level feature extractor and generating a low-level feature descriptor of the video sequence, generating, using a feature parameter mapping model, possible parameter sets based on the low-level feature descriptor, selecting the parameter set based on the feasible parameter set and the possible parameter set, and transmitting the parameter set from the cloud side to the customer side.

In addition to one or more of the features described above, or as an alternative, further embodiments of the active commissioning system include wherein generating feasible parameter sets based on the exhaustively processed events with annotations from the exhaustive VA processor includes selecting all parameter sets that can detect the event as annotated, avoiding parameter sets that provide erroneous detection of the event, and combining all selected parameter sets for all events with annotations from the video sequence.

In addition to one or more of the features described above, or as an alternative, further embodiments of the active commissioning system include wherein the subparts of the video sequence include one or more of unedited video segments, unedited image stills, cropped video segments, cropped image stills, edited video segments, and edited image stills.

In addition to one or more of the features described above, or as an alternative, further embodiments of the active commissioning system include wherein the video capture device is one selected from a group consisting of a stationary surveillance camera, a mobile surveillance camera, a photo camera, a mobile device mounted camera, a motor vehicle mounted camera, and a unmanned aerial vehicle mounted camera.

In addition to one or more of the features described above, or as an alternative, further embodiments of the active commissioning system include wherein the parameter set includes one or more parameters selected from a group consisting of object size, object shape, object movement pattern, object acceleration rate, object velocity, object color, number of objects, interaction between objects, time values of object in certain positions, time values of object in certain locations, time of day, object type, video background learning update rate, video background learning initial learning time, object stopping time, and object loitering time.

In addition to one or more of the features described above, or as an alternative, further embodiments of the active commissioning system include wherein an event includes detecting or tracking one or more of the parameters included in the parameter set, general objects detection, object loitering detection, and object left-behind detection.

According to one embodiment a computer program product to configure an active commissioning system for video analytics (VA) for video surveillance is provided. The computer program product including a computer readable storage medium having program instructions embodied therewith. The program instructions executable by one or more processors to cause the processors to capture, using a video capture device, a video sequence, receive, at a VA processor, a parameter set from a cloud resource, wherein the parameter set is used for video analytics, process the video sequence, using the VA processor, by selecting subparts of the video sequence as events, wherein the events are detected based on the parameter set used by the VA processor, generate a visualized report using the events from the VA processor and providing the visualized report to an operator, mark, by the operator, yes/no on the events in the visualized report, generate annotations for events based on the marking, and transmit the annotations and the events to the cloud resource for processing, wherein the cloud resource processes the annotations and events and provides the parameter set based on the processing.

In addition to one or more of the features described above, or as an alternative, further embodiments of the computer program product include having additional program instructions embodied therewith, the program instructions executable by the one or more processors to cause the processors to receive the annotations and the events in a video database of the cloud resource, process events with annotations with an exhaustive VA processor of the cloud resource, generate feasible parameter sets based on the exhaustively processed events with annotations from the exhaustive VA processor, process video segments without annotations with a low-level feature extractor of the cloud resource and generating a low-level feature descriptor of the video sequence, generate, using a feature parameter mapping model, possible parameter sets based on the low-level feature descriptor, select the parameter set based on the feasible parameter set and the possible parameter set, and transmit the parameter set from the cloud resource to the VA processor.

In addition to one or more of the features described above, or as an alternative, further embodiments of the computer program product include wherein generating feasible parameter sets based on the exhaustively processed events with annotations from the exhaustive VA processor includes selecting all parameter sets that can detect the event as annotated, avoiding parameter sets that provide erroneous detection of the event, and combining all selected parameter sets for all events with annotations from the video sequence.

In addition to one or more of the features described above, or as an alternative, further embodiments of the computer program product include wherein the subparts of the video sequence include one or more of unedited video segments, unedited image stills, cropped video segments, cropped image stills, edited video segments, and edited image stills.

In addition to one or more of the features described above, or as an alternative, further embodiments of the computer program product include wherein the video capture device is one selected from a group consisting of a stationary surveillance camera, a mobile surveillance camera, a photo camera, a mobile device mounted camera, a motor vehicle mounted camera, and a unmanned aerial vehicle mounted camera.

In addition to one or more of the features described above, or as an alternative, further embodiments of the computer program product include wherein the parameter set includes one or more parameters selected from a group consisting of object size, object shape, object movement pattern, object acceleration rate, object velocity, object color, number of objects, interaction between objects, time values of object in certain positions, time values of object in certain locations, time of day, object type, video background learning update rate, video background learning initial learning time, object stopping time, and object loitering time, and wherein an event includes detecting or tracking one or more of the parameters included in the parameter set, general objects detection, object loitering detection, and object left-behind detection.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to computer vision, video processing, and cloud computing, and teaches a cloud-based active commissioning system for video analytics. One or more exemplary embodiments as disclosed herein reduce the setup cost of video analytics systems for video surveillance. This is provided during configuration such that the operator does not need any special computer vision knowledge, and needs only to interactively mark yes/no on the events reported by the video analytics algorithms. The best parameters can then be retrieved from the cloud to be applied on the local client.

According to one or more embodiments, implementing a cloud computing parameter commissioning system can provide advantages such as large storage, great computing power, and a crowd of customers. Customers can securely and privately share video data with ground truth to the cloud to create a valuable and large database which can be built and updated over time. From the database, knowledge can be discovered after corresponding computing is implemented for a customer's specific request.

Additionally, one or more exemplary embodiments employ a "Share then Discover" feature of cloud computing to ease the setting up of video analytics systems by shifting the expert knowledge of computer vision from an operator (end user) to the cloud, and by discovering a parameter set for each specific request based on the shared video/ground truth database.

It is understood in advance that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
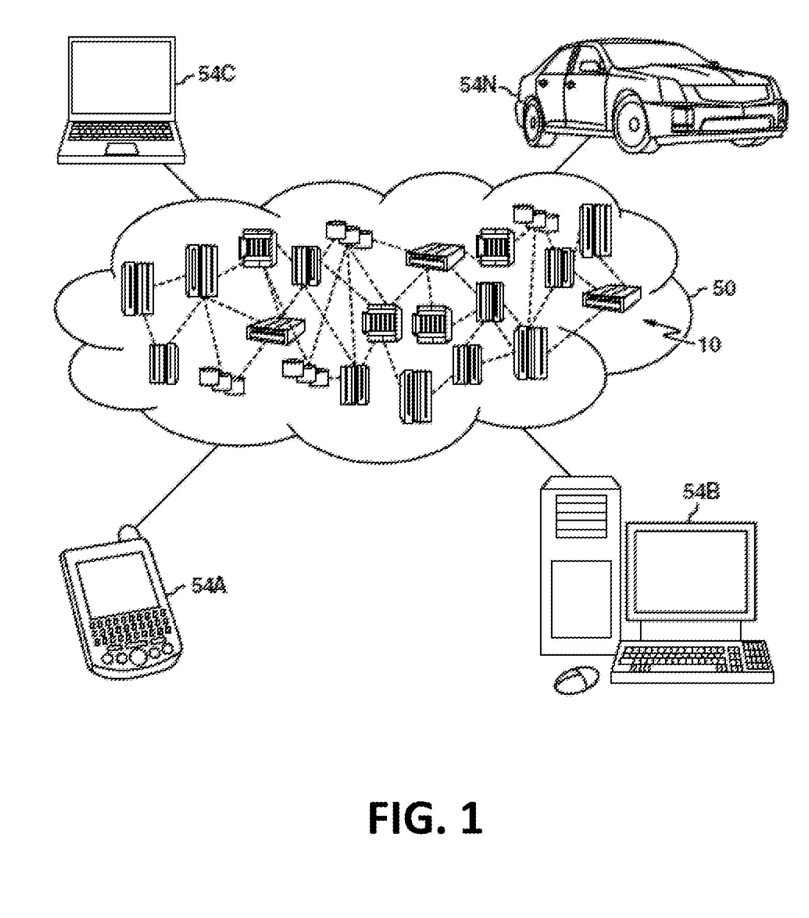
FIG. 1 depicts a cloud computing environment in accordance with one or more exemplary embodiments.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
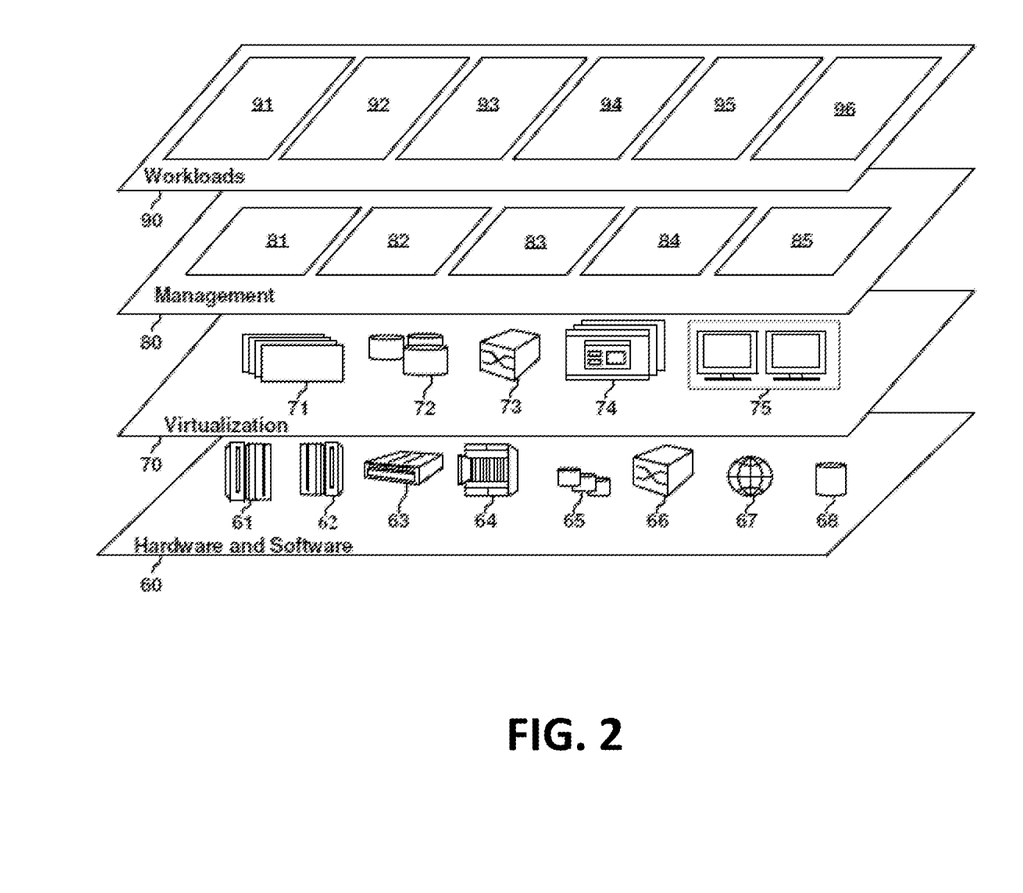
FIG. 2 depicts abstraction model layers in accordance with one or more exemplary embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing of messages across multiple communication systems 96.

In accordance with exemplary embodiments of the disclosure, methods, systems and computer program products for prioritizing delivery of messages across multiple communication systems are provided. In exemplary embodiments, a messaging system is configured to receive messages for an individual across multiple communication systems utilized by the individual. The messaging system is also configured to determine a priority level associated with each of the messages based on an analysis of the messages and a user profile of the individual. Based on the determined priority level and the user profile, the messaging system delivers the messages to a desired communication device via a desired messaging system. In exemplary embodiments, the user profile is updated by the messaging system upon receiving feedback from the individual, wherein the feedback includes message delivery preferences and message priority preferences of the individual.

Figure 3:
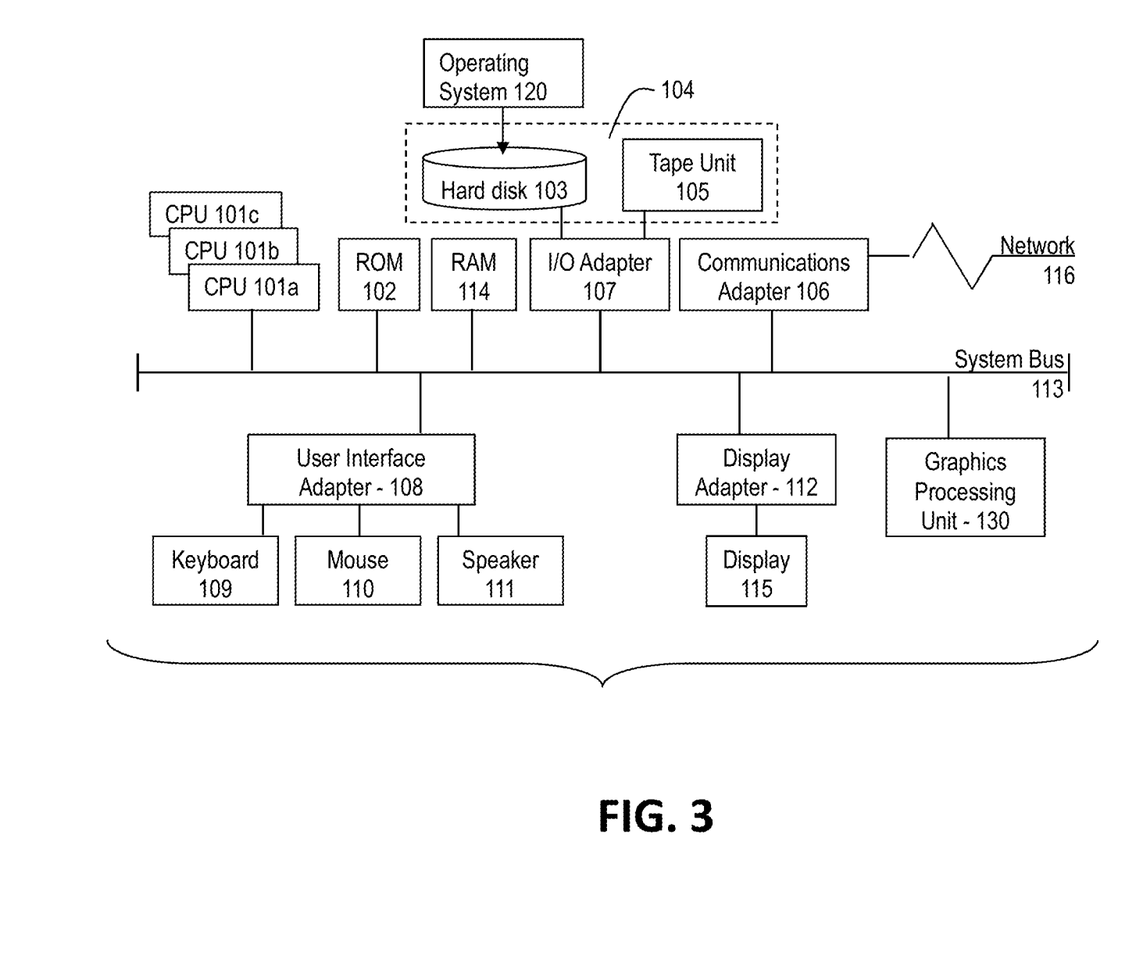
FIG. 3 is a block diagram illustrating one example of a processing system for practice of the teachings herein in accordance with one or more exemplary embodiments.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
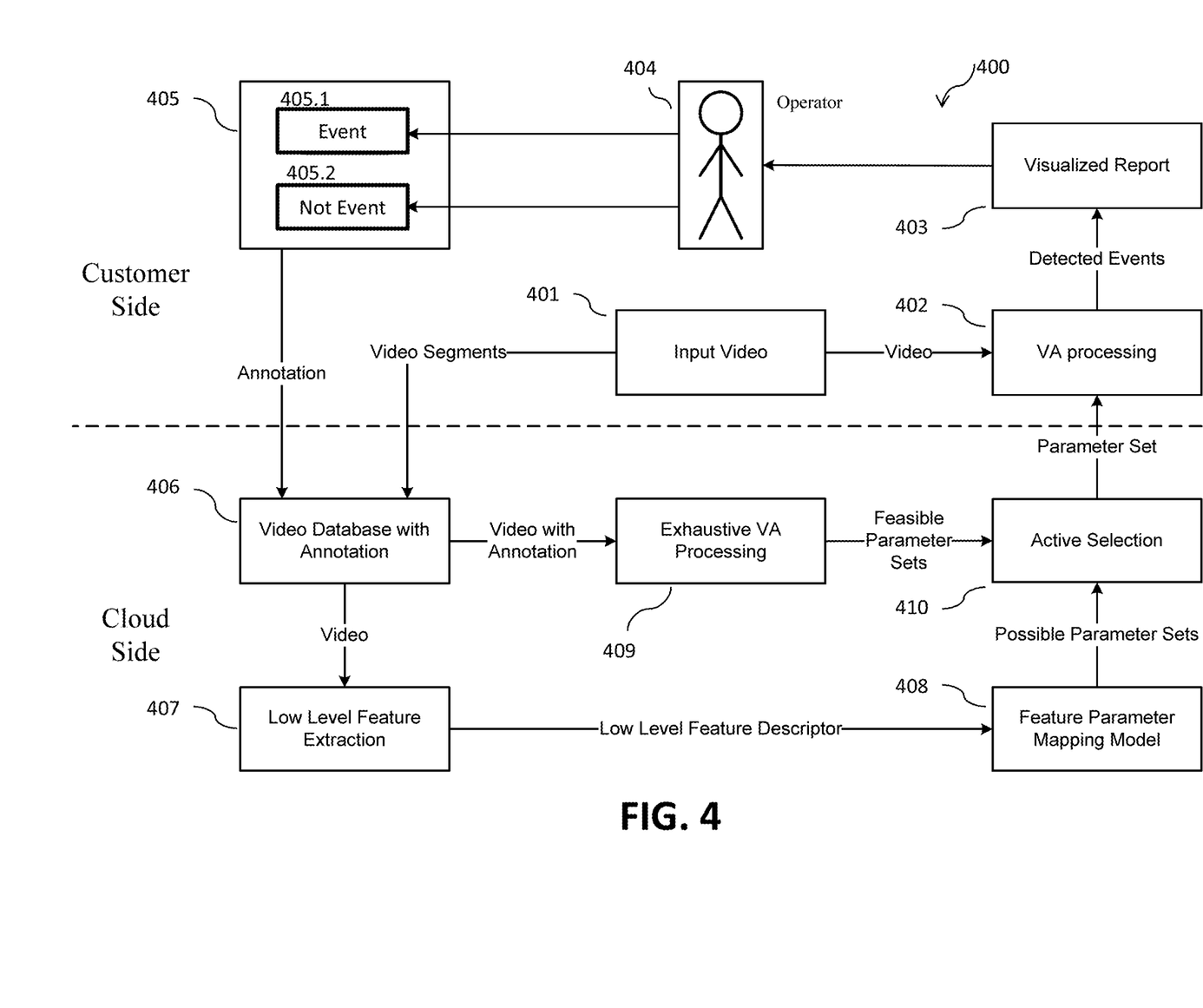
FIG. 4 illustrates a block diagram of a cloud based active commissioning system for video analytics in accordance with one or more exemplary embodiments.

Turning now to FIG. 4, a block diagram of a cloud based active commissioning system 400 for video analytics is shown in accordance with one or more embodiments. As shown, the system is split between a customer side and a cloud side. The customer side includes a video capture device 401 that is used to capture a video sequence as an input video. The video capture device 401 can be a stationary surveillance camera, a mobile surveillance camera, a photo camera, a mobile device mounted camera, a motor vehicle mounted camera, or an unmanned aerial vehicle mounted camera. The video capture device 401 outputs the video sequence toward a processing element.

Specifically, the customer side also includes a video analytics (VA) processor 402 that does VA processing on the video sequence captured and provided by the video capture device 401. The VA processor 402 processes the video sequence by selecting subparts of the video sequence. These subparts are called events. The subparts (or events) of the video sequence can be, for example, an unedited video segments, unedited image stills, cropped video segments, cropped image stills, edited video segments, or edited image stills. The VA processor 402 does this processing using a parameter set that is received from the cloud side from cloud resources. Accordingly, this relieves the need for the parameters to be selected and provided by an element on the customer side alleviating processing requirements on the customer side.

The VA processor 402 then provides the detected events that organized into a visualized report 403. The visualized report 403 can be generated by a customer side computing device that can include any one of the VA processor 402 or a separate computing device with a processor that is located near the VA processor 402 or an operator 404. The visualized report 403 is then provided to an operator 404. The operator views the visualized report that contains the detected events.

The operator 404 then actively/interactively marks 405 the events with either a yes or no indicating whether the detected event is an event 405.1 or is not an event 405.2, respectively. Particularly the operator 404 marks the detected event with yes when the detected event is in fact an event 405.1 according to the operator 404. Alternatively, the operator 404 can mark the detected event with a no when the detected event is not an event 405.2.

Additionally, based on the operator 404 markings of the detected events, annotations will be generated. Specifically, an annotation will be created for any detected event that are marks with a yes indicating that the detected event is, in fact, an event 405.1 according to the operator 404.

Further, the annotations that are generated will be transmitted to the cloud side of the overall system. Additionally, all the detected events, specifically the video segments, will also be transmitted to the cloud side of the overall system along with the corresponding annotations for the detected events marked as events.

On the cloud side, the annotations and the video segments (detected events) are received in a video database 406. The video database stores the events along with their corresponding annotations and also stores the other events marked with no by the operation which do not have corresponding annotations. Said another way, the video segments from the customer side together with annotations will be stored in the cloud database. Accordingly, the number of videos in cloud database is continuously increasing with the addition of any new videos from customer side.

Next, the events with annotations are transmitted to an exhaustive VA processor 409 that does exhaustive VA processing on the event video sequence. For example, processing may be provided that detects and tracks object size, object shape, object movement pattern, object acceleration rate, object velocity, object color, number of objects, interaction between objects, time values of object in certain positions, time values of object in certain locations, time of day, object type, video background learning update rate, video background learning initial learning time, object stopping time, and object loitering time. From these, feasible parameters sets that are determined during exhaustive processing are generated. The feasible parameter sets are parameter sets that can detect that annotated events while avoiding erroneous detection.

Further, the video segments without annotations are transmitted to a low-level feature extractor 407 that does low-level feature extraction. For example features such as foreground holistic features, texture features, feature points, motion flow, and color tracking are extracted during processing of the video segments received for processing that do not have annotations. From this processing is created a low-level feature descriptor that contains values for such features such as, for example, the foreground holistic features, texture features, feature points, motion flow, and color tracking. Said simply, according to one embodiment, the video segments are processed to get the features.

The low-level feature descriptor is provided to a feature parameter mapping model 408 that generates possible parameter sets. The possible parameter sets that are generated are transmitted to the same destination as the feasible parameter sets that are generated by the exhaustive VA processor 409.

Particularly, both the feasible parameter sets generated based on the annotated events and the possible parameter sets generated based on a low-level feature descriptor are received at an active selector 410 that does active selection of a parameter set that is provided to the customer side. Particularly, the parameter set that is selected by the active selector 410 is transmitted to the VA processor 402 on the customer side which is used by the VA processor 402, as explained above, to processes a collected video sequence. According to an embodiment, the active selector 410 uses the possible parameter sets to greatly reduce the set size of feasible parameter sets to arrive at the parameter set that is transmitted to the customer side.

Figure 5:
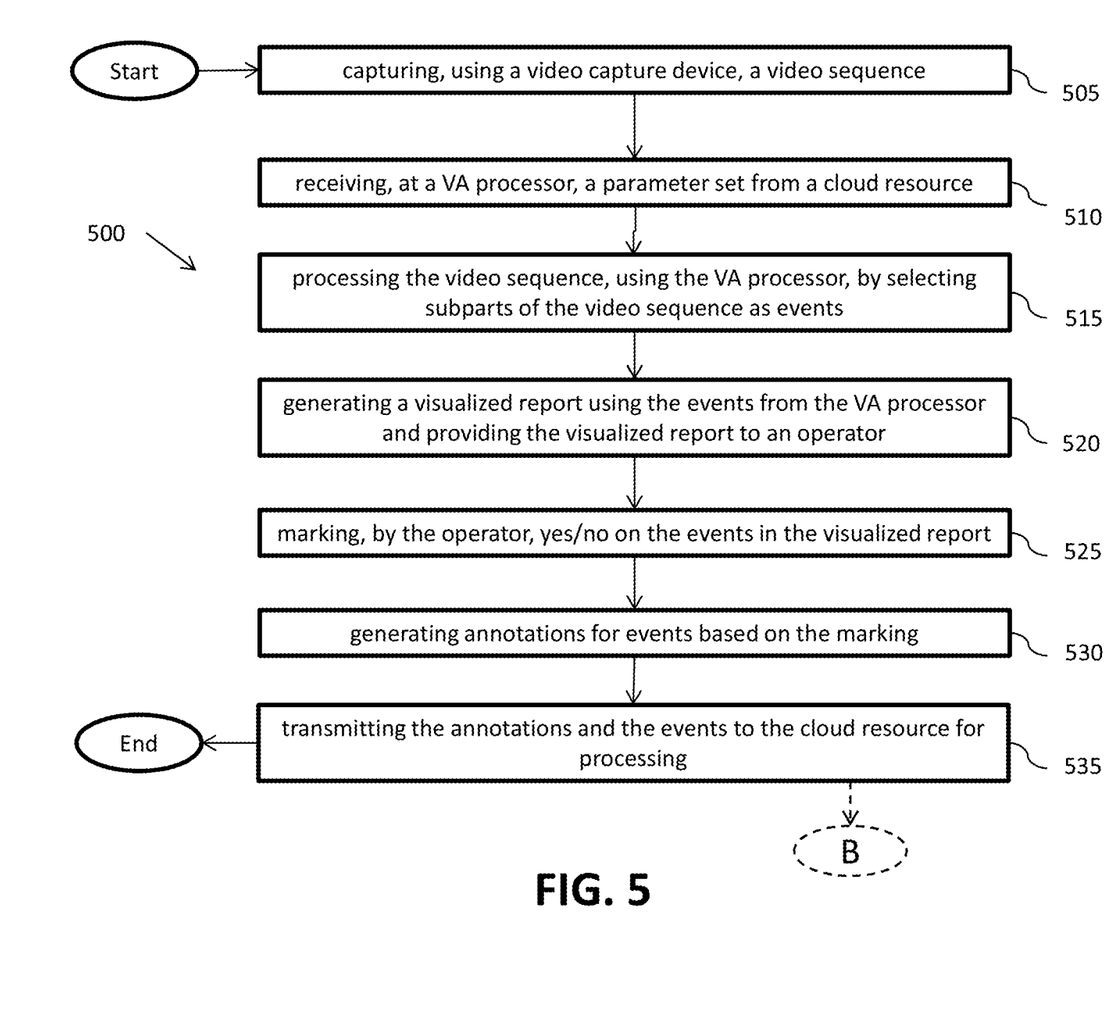
FIG. 5 illustrates a flowchart of a method for an active commissioning system for video analytics (VA) of video surveillance in accordance with one or more exemplary embodiments.

FIG. 5 illustrates a flowchart of a method 500 for an active commissioning system for video analytics (VA) of video surveillance in accordance with one or more exemplary embodiments. The method includes capturing, using a video capture device, a video sequence (operation 505) and receiving, at a VA processor, a parameter set from a cloud resource, wherein the parameter set is used for video analytics (operation 510). The method 500 further includes processing the video sequence, using the VA processor, by selecting subparts of the video sequence as events, wherein the events are detected based on the parameter set used by the VA processor (operation 515) and generating a visualized report using the events from the VA processor and providing the visualized report to an operator (operation 520). The method also includes marking, by the operator, yes/no on the events in the visualized report (operation 525), generating annotations for events based on the marking (operation 530), and transmitting the annotations and the events to the cloud resource for processing, wherein the cloud resource processes the annotations and events and provides the parameter set based on the processing (operation 535).

According to one or more other embodiments, the subpart of the video sequence is an unedited video segments, unedited image stills, cropped video segments, cropped image stills, edited video segments, edited image stills, or a combination thereof. Further, according to one or more other embodiments the video capture device is stationary surveillance camera, a mobile surveillance camera, a photo camera, a mobile device mounted camera, a motor vehicle mounted camera, an unmanned aerial vehicle mounted camera, or a combination thereof.

According to other embodiments, a parameter set includes object size, object shape, object movement pattern, object acceleration rate, object velocity, object color, number of objects, interaction between objects, time values of object in certain positions, time values of object in certain locations, time of day, object type, video background learning update rate, video background learning initial learning time, object stopping time, object loitering time, or a combination thereof. Further, in one or more embodiments an event can be defined as including the detection and/or tracking of one or more of the parameters included in the parameter, set general objects detection, object loitering detection, and/or object left-behind detection.

Figure 6:
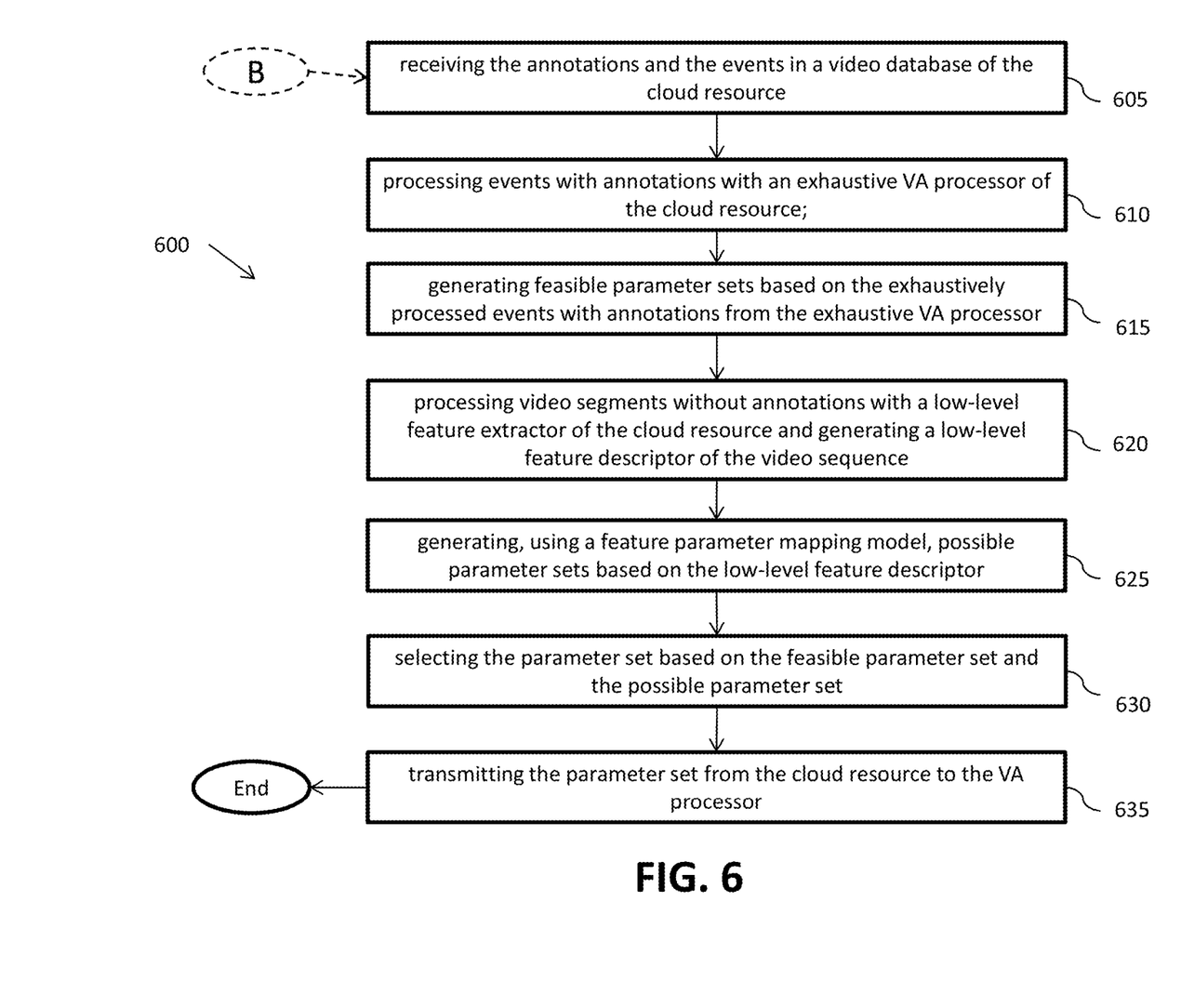
FIG. 6 illustrates a flowchart with additional operations for a method for an active commissioning system for video analytics (VA) of video surveillance in accordance with one or more exemplary embodiments.

FIG. 6 illustrates a flowchart with additional operations 600 for a method for an active commissioning system for video analytics (VA) of video surveillance in accordance with one or more exemplary embodiments. For example, according to an embodiment, the additional operations 600 may occur after the operations of the method 500 as disclosed in FIG. 5 connecting through 'B' as shown.

The additional operations 600 includes receiving the annotations and the events in a video database of the cloud resource (operation 605), processing events with annotations with an exhaustive VA processor of the cloud resource (operation 610), and generating feasible parameter sets based on the exhaustively processed events with annotations from the exhaustive VA processor (operation 615). The additional operations 600 further include processing video segments without annotations with a low-level feature extractor of the cloud resource and generating a low-level feature descriptor of the video sequence (operation 620) and generating, using a feature parameter mapping model, possible parameter sets based on the low-level feature descriptor (operation 625). Finally, the additional operations 600 includes selecting the parameter set based on the feasible parameter set and the possible parameter set (operation 630) and transmitting the parameter set from the cloud resource to the VA processor (operation 635).

According to another embodiment, generating feasible parameter sets based on the exhaustively processed events with annotations from the exhaustive VA processor may include further sub-operations to accomplish the generating of the feasible parameter sets. Particularly, selecting all parameter sets that can detect the event as annotated and avoiding parameter sets that provide erroneous detection of the event are included. Further, generating the feasible parameter sets includes the operation of combining all selected parameter sets for all events with annotations from the video sequence.

According to another embodiment, at the customer side, video analytics algorithms (VA) process the input video using one parameter set. Further, in specific embodiments, the detected events will be visualized to the operator, who will annotate: "No" for nuisance or false detections, and "Yes" for true event detection. Additionally, missed events can be annotated as "Yes" at the relevant position in the video sequence. Further, in accordance with one or more embodiments, the operator need not annotate the whole video sequence as only partial annotation is needed.

Further, in accordance with one or more embodiments, the annotated video segments and corresponding annotation are sent to the cloud side, and stored in a video database with annotation. At the cloud side, new video segments will be processed by video analytics algorithms (VA) exhaustively to get all parameter sets which can detect the annotated the events while avoiding the erroneous detections. Combining the results of other processed video segments belonging to the same video sequence, the "Feasible Parameter Sets" for the video sequence is derived according to the best current knowledge.

Further, according to one or more embodiments, at substantially the same time, also at the cloud side, low level features (e.g., foreground holistic features, texture features, feature points, motion flow, and color tracking) will be extracted from video segments to get a descriptor for the whole video sequence. Based on the feature parameter mapping model (built based on historical data), possible parameter sets for the video sequence is generated. Here, every parameter set in the possible parameter sets has one possibility assigned.

According to other embodiments, a feature parameter mapping model is one hierarchy to recorder the relationship between low level features (e.g., foreground holistic features, texture features, feature points, motion flow, and color tracking) of one video sequence and the succeed parameter set. This model can be built by supervised learning methods according to the historical data.

According to other embodiments, based on a feasible parameter set and a possible parameter set, active selection can be implemented for the video sequence to predict the parameter set, which can greatly reduce the set size of feasible parameter sets in next iterations. Finally, the parameter is sent to the customer side.

Advantageously, embodiments described herein take advantage of the "Share then Discover" power of cloud computing that is employed to configure the video analytics system. Further, event based video segments with annotation are the basic processing unit rather than the whole video sequence. This greatly reduces the annotation requirements and computing load. Additionally, actively selecting a parameter set to run video analytics algorithms for the operator to verify greatly reduces the operators' workload. Further, in order to set up video analytics system, the operators are not required to have computer vision knowledge. Also feasible parameter sets and possible parameter sets are computed independently.

Thus, according to one or more embodiments, the cloud based active commissioning system removes the requirements of computer vision expertise from the setup of video analytics systems, and operators do not require extensive training and do not expend a long time to achieve good VA performance. This may reduce the cost of system setup and enlarges the application domain. This may also help reduce the cost of manpower for the setup of video analytics products.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects in accordance with one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method for an active commissioning system for video analytics (VA) of video surveillance, the method comprising:
    capturing, using a video capture device, a video sequence;
    receiving, at a VA processor, a parameter set from a cloud resource, wherein the parameter set is used for video analytics;
    processing the video sequence, using the VA processor, by selecting subparts of the video sequence as events, wherein the events are detected based on the parameter set used by the VA processor;
    generating a visualized report using the events from the VA processor and providing the visualized report to an operator;
    marking, by the operator, yes/no on the events in the visualized report;
    generating annotations for events based on the marking; and
    transmitting the annotations and the events to the cloud resource for processing, wherein the cloud resource processes the annotations and events and provides a predicted parameter set as the parameter set based on the processing, the predicted parameter used as the parameter set in a next iteration of processing the video sequence;
    the method further comprising:
    receiving the annotations and the events in a video database of the cloud resource;
    processing events with annotations with an exhaustive VA processor of the cloud resource;
    generating feasible parameter sets based on the exhaustively processed events with annotations from the exhaustive VA processor;
    processing video segments without annotations with a low-level feature extractor of the cloud resource and generating a low-level feature descriptor of the video sequence;
    generating, using a feature parameter mapping model, possible parameter sets based on the low-level feature descriptor;
    selecting the predicted parameter set based on the feasible parameter set and the possible parameter set; and
    transmitting the predicted parameter set from the cloud resource to the VA processor.

2. The method of claim 1, wherein generating feasible parameter sets based on the exhaustively processed events with annotations from the exhaustive VA processor comprises:
    selecting all parameter sets that can detect the event as annotated;
    avoiding parameter sets that provide erroneous detection of the event; and
    combining all selected parameter sets for all events with annotations from the video sequence.

3. The method of claim 1, wherein the subparts of the video sequence include one or more of unedited video segments, unedited image stills, cropped video segments, cropped image stills, edited video segments, and edited image stills.

4. The method of claim 1, wherein the video capture device is one selected from a group consisting of a stationary surveillance camera, a mobile surveillance camera, a photo camera, a mobile device mounted camera, a motor vehicle mounted camera, and an unmanned aerial vehicle mounted camera.

5. The method of claim 1, wherein the parameter set includes one or more parameters selected from a group consisting of object size, object shape, object movement pattern, object acceleration rate, object velocity, object color, number of objects, interaction between objects, time values of object in certain positions, time values of object in certain locations, time of day, object type, video background learning update rate, video background learning initial learning time, object stopping time, and object loitering time.

6. The method of claim 5, wherein an event includes detecting or tracking one or more of the parameters included in the parameter set, general objects detection, object loitering detection, and object left-behind detection.

7. An active commissioning system for video analytics (VA) for video surveillance, the active commissioning system comprising:
a customer side that comprises:
a customer memory having computer readable instructions; and
one or more customer processors configured to execute the computer readable instructions to perform operations comprising:
capturing, using a video capture device, a video sequence;
receiving a parameter set from a cloud resource, wherein the parameter set is used for video analytics;
processing the video sequence by selecting subparts of the video sequence as events, wherein the events are detected based on the parameter set;
generating a visualized report using the events and providing the visualized report to an operator;
marking, by the operator, yes/no on the events in the visualized report;
generating annotations for events based on the marking; and
transmitting the annotations and the events to the cloud resource for processing, wherein the cloud resource processes the annotations and events and provides a predicted parameter set as the parameter set based on the processing, the predicted parameter used as the parameter set in a next iteration of processing the video sequence;
the system further comprising:
a cloud side that includes the cloud resource that is comprised of:
a cloud memory having computer readable instructions; and
one or more cloud processors configured to execute the computer readable instructions to perform operations comprising:
receiving the annotations and the events in a video database;
processing events with annotations with an exhaustive VA processor;
generating feasible parameter sets based on the exhaustively processed events with annotations from the exhaustive VA processor;
processing video segments without annotations with a low-level feature extractor and generating a low-level feature descriptor of the video sequence;
generating, using a feature parameter mapping model, possible parameter sets based on the low-level feature descriptor;
selecting the predicted parameter set based on the feasible parameter set and the possible parameter set; and
transmitting the predicted parameter set from the cloud side to the customer side.

8. The active commissioning system of claim 7, wherein generating feasible parameter sets based on the exhaustively processed events with annotations from the exhaustive VA processor comprises:
selecting all parameter sets that can detect the event as annotated;
avoiding parameter sets that provide erroneous detection of the event; and
combining all selected parameter sets for all events with annotations from the video sequence.

9. The active commissioning system of claim 7, wherein the subparts of the video sequence include one or more of unedited video segments, unedited image stills, cropped video segments, cropped image stills, edited video segments, and edited image stills.

10. The active commissioning system of claim 7, wherein the video capture device is one selected from a group consisting of a stationary surveillance camera, a mobile surveillance camera, a photo camera, a mobile device mounted camera, a motor vehicle mounted camera, and an unmanned aerial vehicle mounted camera.

11. The active commissioning system of claim 7, wherein the parameter set includes one or more parameters selected from a group consisting of object size, object shape, object movement pattern, object acceleration rate, object velocity, object color, number of objects, interaction between objects, time values of object in certain positions, time values of object in certain locations, time of day, object type, video background learning update rate, video background learning initial learning time, object stopping time, and object loitering time.

12. The active commissioning system of claim 11, wherein an event includes detecting or tracking one or more of the parameters included in the parameter set, general objects detection, object loitering detection, and object left-behind detection.

13. A computer program product to configure an active commissioning system for video analytics (VA) for video surveillance, the computer program product comprising a non-transitory computer readable storage medium having program instructions embodied therewith, the program instructions executable by one or more processors to cause the processors to:
capture, using a video capture device, a video sequence;
receive, at a VA processor, a parameter set from a cloud resource, wherein the parameter set is used for video analytics;
process the video sequence, using the VA processor, by selecting subparts of the video sequence as events, wherein the events are detected based on the parameter set used by the VA processor;
generate a visualized report using the events from the VA processor and providing the visualized report to an operator;

mark, by the operator, yes/no on the events in the visualized report;
generate annotations for events based on the marking; and
transmit the annotations and the events to the cloud resource for processing, wherein the cloud resource processes the annotations and events and provides a predicted parameter set as the parameter set based on the processing, the predicted parameter used as the parameter set in a next iteration of processing the video sequence;

the program instructions executable by one or more processors to further cause the processors to:
receive the annotations and the events in a video database of the cloud resource;
   process events with annotations with an exhaustive VA processor of the cloud resource;
   generate feasible parameter sets based on the exhaustively processed events with annotations from the exhaustive VA processor;
   process video segments without annotations with a low-level feature extractor of the cloud resource and generating a low-level feature descriptor of the video sequence;
   generate, using a feature parameter mapping model, possible parameter sets based on the low-level feature descriptor;
   select the predicted parameter set based on the feasible parameter set and the possible parameter set; and
   transmit the predicted parameter set from the cloud resource to the VA processor.

14. The computer program product of claim 13, wherein generating feasible parameter sets based on the exhaustively processed events with annotations from the exhaustive VA processor comprises:
selecting all parameter sets that can detect the event as annotated;
avoiding parameter sets that provide erroneous detection of the event; and
combining all selected parameter sets for all events with annotations from the video sequence.

15. The computer program product of claim 13, wherein the subparts of the video sequence include one or more of unedited video segments, unedited image stills, cropped video segments, cropped image stills, edited video segments, and edited image stills.

16. The computer program product of claim 13, wherein the video capture device is one selected from a group consisting of a stationary surveillance camera, a mobile surveillance camera, a photo camera, a mobile device mounted camera, a motor vehicle mounted camera, and an unmanned aerial vehicle mounted camera.

17. The computer program product of claim 13, wherein the parameter set includes one or more parameters selected from a group consisting of object size, object shape, object movement pattern, object acceleration rate, object velocity, object color, number of objects, interaction between objects, time values of object in certain positions, time values of object in certain locations, time of day, object type, video background learning update rate, video background learning initial learning time, object stopping time, and object loitering time, and wherein an event includes detecting or tracking one or more of the parameters included in the parameter set, general objects detection, object loitering detection, and object left-behind detection.

* * * * *